B. J. ALLEN.
METHOD OF MOLDING SEMISOLID SUBSTANCES.
APPLICATION FILED AUG. 14, 1917.
1,337,811.
Patented Apr. 20, 1920.
2 SHEETS—SHEET 1.
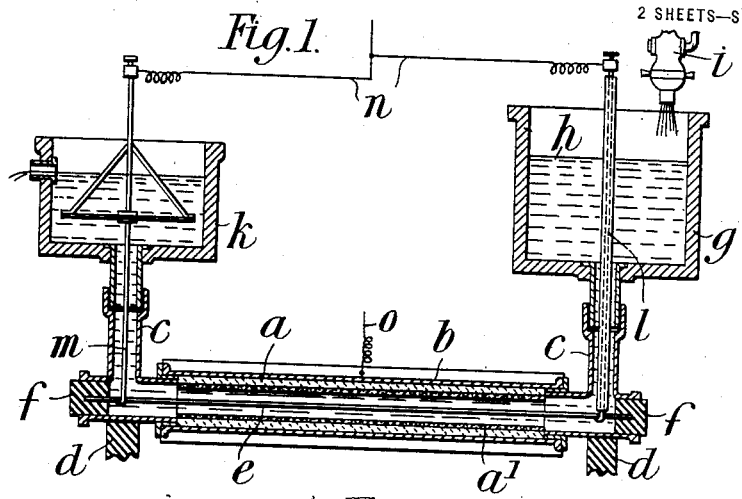
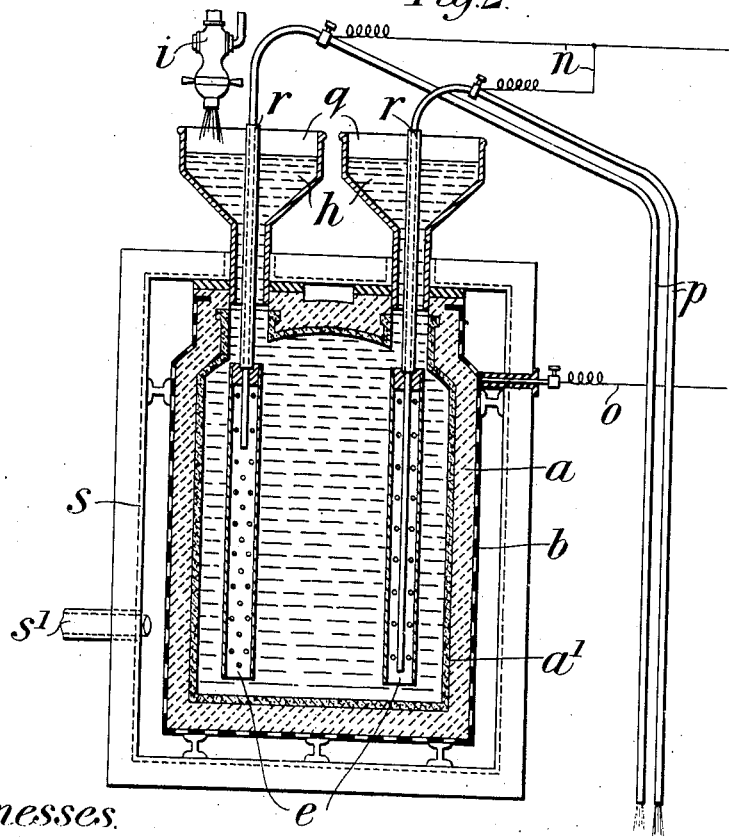
Witnesses
J. K. Moore
Inventor
Bernard J. Allen B. J. ALLEN.
METHOD OF MOLDING SEMISOLID SUBSTANCES.
APPLICATION FILED AUG. 14, 1917.

1,337,811.

Patented Apr. 20, 1920.

Witnesses
J. K. Moore
L. L. Burket

Inventor
Bernard J. Allen ns of this invention are wider than those outlined here.

UNITED STATES PATENT OFFICE.

BERNARD JAMES ALLEN, OF STOKE-UPON-TRENT, ENGLAND.

METHOD OF MOLDING SEMISOLID SUBSTANCES.

1,337,811. Specification of Letters Patent. Patented Apr. 20, 1920.

Application filed August 14, 1917. Serial No. 186,126.

*To all whom it may concern:*

Be it known that I, BERNARD JAMES ALLEN, a subject of the King of Great Britain, residing at "Llangladure," Blythe Bridge, Stoke-upon-Trent, Staffordshire, England, have invented new and useful Improvements in the Methods of Molding Semisolid Substances, of which the following is a specification.

This invention relates to the manufacture of articles of clay, plumbago and other like substances.

My improved process of manufacture, according to the invention, consists in obtaining a deposit of clay, plumbago or the like by electro-deposition upon a mold which is either absorbent or otherwise.

In applying the invention to the deposition of material on a plaster or absorbent mold, I attach to the outside of the latter a metal plate or plates, perforated or otherwise, which is or are connected to the negative or positive pole of a source of electrical energy according to whether the material to be deposited is electro-negative or electro-positive. The other electrode of the electric circuit is provided by a metal plate or plates suspended inside the mold. The material to be deposited is mixed as a liquid with a suitable addition of acid or alkali and poured into the mold. Electrical energy of suitable volume and density is then applied through the metal plates, which form electrodes, whereby the suspended material is caused to migrate in the direction of the electrode on the outside of the mold, the said material being intercepted by, and deposited on, the inside face of the mold. The liquid is usually repelled from the electrode which attracts the suspended material and may be siphoned or otherwise run off when a suitable thickness of material has been deposited.

If the electrically deposited material is too dense for the purpose required, the electric current may be reversed for a period or periods or the pressure varied and a more porous or less dense article be produced. The reversal of the current may also be used to partly release the deposited material from the mold. The effect of the reversal is to attract the liquid to the mold and repel the deposited material.

When the desired deposit is obtained the electric current is switched off, the superfluous liquid mixture removed and the plaster or other absorbent mold allowed to absorb the remaining liquid. If the deposited material is too dense or plastic to allow the absorbent mold to extract the remaining liquid a vacuum jacket may be arranged around the mold to exert a suction action thereon and so assist the abstraction of the moisture. Moreover, in the production of articles of uneven or graduated thickness, the attracting electrode may be applied to those parts of the mold where the greatest thickness is required and the repelling electrode to the parts where the least thickness is desired; or the mold may be made of greatest thickness where the thinnest deposit is required or vice versa or any other convenient means may be utilized for the purpose.

In applying the invention to a non-absorbent mold I advantageously provide a type metal or other metal mold the inside of which is formed to give the shape of article required and I support the mold on suitable insulators. A brass or other metal plate or plates is suspended inside the mold, and the mold and the suspended plate or plates are connected to a source of electrical energy. The material to be deposited is mixed as a liquid with a suitable addition of acid or alkali and poured into the mold, thus completing the circuit. If the material to be deposited is electro-negatively charged and the positive terminal is connected to the mold, the material is attracted to, and is deposited on, the mold, the liquid being attracted to the suspended plate or plates where it may be siphoned off or otherwise removed.

When a suitable thickness of deposit has been obtained on the metal mold the electric current may be reversed for a period or periods and thus cause the deposited material to be repelled sufficiently to release the article from the mold.

The density of the deposited material and the amount of liquid left in the electro-deposited article is dependent on the electrical pressure used; the higher the voltage used the denser will be the deposit and the smaller the percentage of liquid retained.

This process can be applied to the manufacture of all articles made from materials which do not require the draining off of all the liquid from the deposited material.

In the accompanying drawings:—

Figure 1 is a vertical section of apparatus having an absorbent mold and suitable for the production of tubes of silica or similar material.

Fig. 2 is a similar view of apparatus specially designed for the production of Woulfe bottles, retorts or stills and the like.

Figure 3:
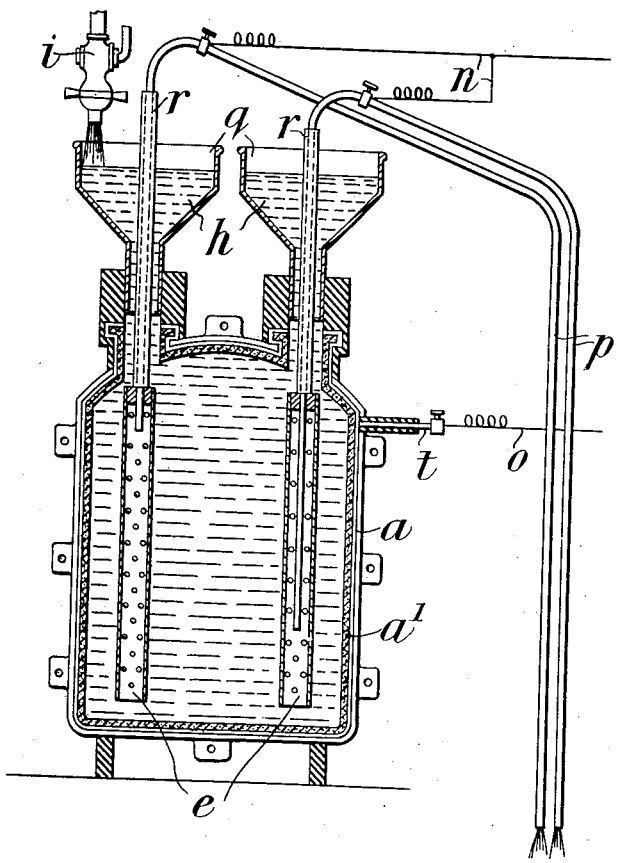
Fig. 3 is a similar view of apparatus having a non-absorbent mold.

Referring first to the apparatus illustrated in Fig. 1, $a$ indicates the absorbent mold and $b$ the depositing electrode, the mold and electrode being supported upon T-shaped fittings $c$ which are of porcelain or like non-conducting material and are themselves carried by the insulating supports $d$. $e$ is the liquid attracting electrode which extends through the mold $a$ and is supported at the ends by the insulating plugs $f$ which are inserted in the T-pieces $c$.

One of the T-pieces $c$ carries at the upper end a tank or trough $g$ for the supply of the slip or mixture of clay and water $h$ which is filled into it through the tap $i$ and flows down through the stem of the said T-piece into the mold. The stem of the other T-piece carries a water reservoir $k$. An insulated rod $l$ passes down through the trough $g$ and stem of the T-pieces and has a metallic connection with one end of the electrode $e$, the other end of which is in connection with the rod $m$ which passes through the water reservoir $k$, both the rod $m$ and the rod $l$ being connected to one pole of the source of current by the wire $n$, the other pole of which is connected to the electrode $b$ by means of the wire $o$.

With this construction the slip $h$ flows from the reservoir $g$ down through the stem of the T-piece $c$ and thence into the mold and when current is passed through the said slip from the electrode $e$ to the electrode $b$, the solid material is attracted or migrates toward the electrode $b$ and is, therefore, intercepted by, and deposited on, the interior surface of the mold, as indicated at $a^1$ while the liquid flows toward the electrode or rod $m$ and collects in the reservoir $k$. If the deposit is too dense the current may be reversed in direction for a suitable time so as to obtain a more porous or less dense deposit. This reversal also serves partially to release the material from the mold as it attracts the liquid to the mold and repels the deposit.

The requisite density having been obtained in the manner above described, the current is discontinued and the liquid mixture which remains in the mold is removed and the latter allowed to absorb any liquid which remains in the deposit.

The apparatus above described and shown in Fig. 1 is particularly suitable for the manufacture of articles from materials which do not require the use of an electrolyte but which do require a circulation or agitation to maintain the particles in suspension. In practice, however, it is advantageous to add about two per cent. of caustic soda or the like to the mixture, which is introduced first into the mold, in order to expedite the electrolytic action.

In Fig. 2 I have illustrated apparatus which is suitable for the production of a Woulfe bottle. $a$ indicates the mold and $b$ the depositing electrode which is in the form of a perforated jacket inclosing the mold $a$ which it serves to reinforce. $e$ indicates two liquid attracting electrodes which are in the form of perforated tubes and are carried by the siphon pipes $p$ which serve for removing the collected water and at the same time to supply current to the said electrodes. For convenience of construction the two siphons are passed through the filling funnels $q$ for the slip, and are insulated by the non-conducting coverings $r$ from the material contained in the said funnels.

As will be understood, when current is passed through the slip $h$ within the mold $a$ from the electrode $e$ to the electrode $b$, the solid material is attracted toward the inner face of the mold on which it deposits, while the liquid migrates to the electrodes $e$, whence it is siphoned off by the siphon pipes $p$. In using the apparatus the voltage must be sufficiently high to deposit the suspended material without sedimentation or separation, and the greater the distance apart of the electrodes the higher must be the voltage.

The manufacture of comparatively small articles from silicious clay, flint or felspar may be effected with a pressure of 60 volts and a current strength between 0.5 and 1.75 amperes. The quantity of current used is in no direct relation to the material deposited on the mold and is, therefore, not governed by Faraday's law. Furthermore, the percentage of dry material to liquid is not important and may vary within very wide limits.

In this modification of apparatus I have shown the mold inclosed in a vacuum jacket $s$ which is in direct communication with a vacuum chamber or pump by the pipe $s^1$. The object of this external vacuum around the mold, is, as above described, to enable the remaining liquid in the mold to be extracted through the absorbent mold, even in the case of a very dense or plastic deposit, the said vacuum causing a suction action through the pores of the mold.

Fig. 3 illustrates the application of the invention to apparatus in which a non-absorbent mold is made use of and the vacuum jacket consequently dispensed with. This mold is, in the arrangement here illustrated, composed of metal such as type metal and is of the shape of the article to be produced, say a Woulfe bottle. It is connected to one pole of a source of electricity by the connection t. In other respects the construction is the same as that shown in Fig. 2, the parts being similarly constructed and similarly arranged and similar letters refer to corresponding parts. As will, therefore, be understood the material to be deposited is introduced in a liquid state through the funnels q with a suitable addition of acid or alkali and current is then passed through the slip h from the electrode e to the electrode a so as to cause the solid portion of the latter to be deposited upon the inside surface of the mold as indicated at $a^1$ the liquid being attracted by the electrodes e from which it is siphoned off by the siphon pipe p. When the desired deposit is obtained the supply of current is interrupted and may be reversed if required for the purpose above specified.

Claims.

1. The method of electrolytically molding substances such as clay, plumbago or like material consisting in introducing the said material suspended in a liquid into a mold, which forms one electrode in an electric circuit, and then passing an electric current through the material between an electrode suspended therein and said mold, so as to cause the solid material to be deposited and molded upon the surface of the mold.

2. The method of electrolytically molding substances such as clay, plumbago or like material consisting in introducing the said material suspended in a liquid into an absorbent mold, creating a vacuum around the external surface of the mold, and passing an electric current through the material so as to cause the solid material to be deposited and molded upon the surface of the mold.

3. The method of molding articles of substances such as clay, plumbago or the like, consisting in introducing the said clay or the like suspended in a liquid into a mold, then passing an electric current through the material in one direction so as to cause the solid material to be deposited and molded upon the surface of the mold and then passing the current through the material in a reverse direction when the article has acquired the proper thickness.

4. An apparatus for molding articles comprising a porous mold having a metallic jacket forming an electrode and in which the material to be molded is placed suspended in a liquid, a second electrode suspended in the mold, and electric wires connected to said electrodes for causing an electric current to pass from the second electrode to the first, whereby the solid portions of the material will be deposited and molded in the mold.

5. An apparatus for molding articles comprising a porous mold having a metallic jacket forming an electrode and in which the material to be molded is placed, a vacuum chamber surrounding said mold, an electrode suspended in the mold, and electric wires connected to said electrodes for causing an electric current to pass from the second to the first electrode and mold the solid portions of the material on the mold.

BERNARD JAMES ALLEN.